(No Model.) 2 Sheets—Sheet 1.
H. F. WISTEMAN.
COMBINED PLOW AND SEEDER.

No. 469,352. Patented Feb. 23, 1892.

Witnesses:

Inventor:
H. F. Wisteman,
By Higson & Higson
Attorneys.

(No Model.) 2 Sheets—Sheet 2.
H. F. WISTEMAN.
COMBINED PLOW AND SEEDER.
No. 469,352. Patented Feb. 23, 1892.
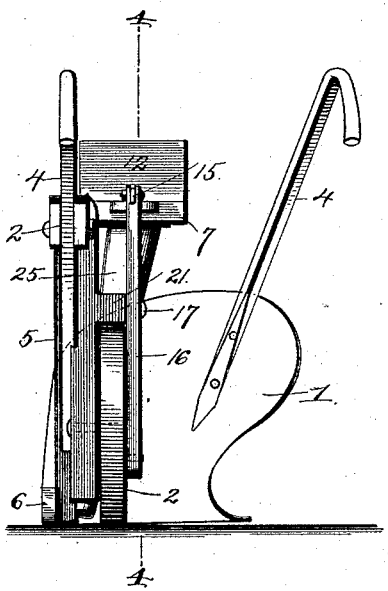
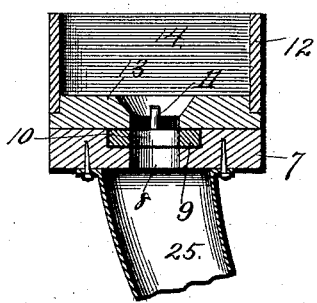
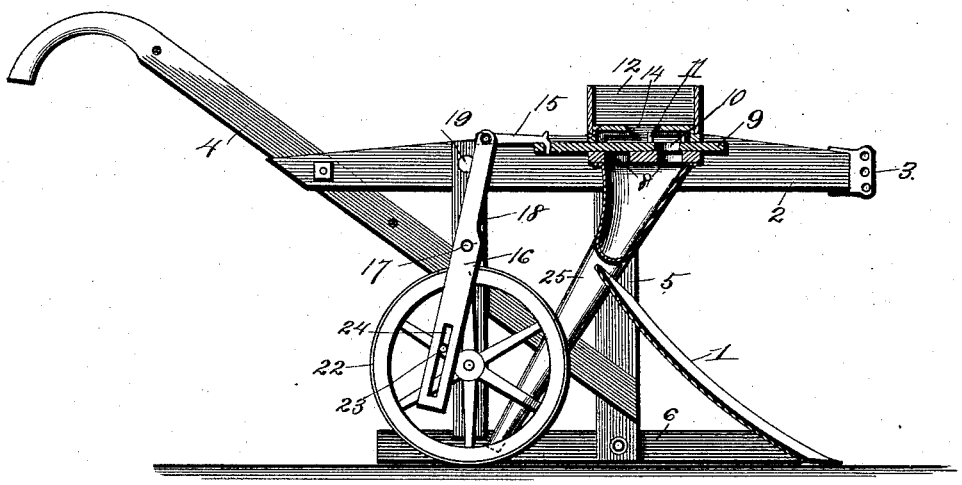
Witnesses:
Inventor,
H. F. Wisteman,
By Higdon & Higdon
Attorneys.

UNITED STATES PATENT OFFICE.

HENRY F. WISTEMAN, OF BELVIDERE, KANSAS.

COMBINED PLOW AND SEEDER.

SPECIFICATION forming part of Letters Patent No. 469,352, dated February 23, 1892.

Application filed November 19, 1891. Serial No. 412,446. (No model.)

*To all whom it may concern:*

Be it known that I, HENRY F. WISTEMAN, of Belvidere, Kiowa county, Kansas, have invented certain new and useful Improvements in a Combined Plow and Seeder, of which the following is a full, clear, and exact description, reference being had to the accompanying drawings, forming a part hereof.

My invention relates to that class of agricultural implements which are used in opening furrows for the purpose of making beds for seed and for sowing seed in rows; and the objects of my invention are to produce a combined plow and seed-drill which shall be simple, durable, and inexpensive in construction and rapid and efficient in its operation.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1:
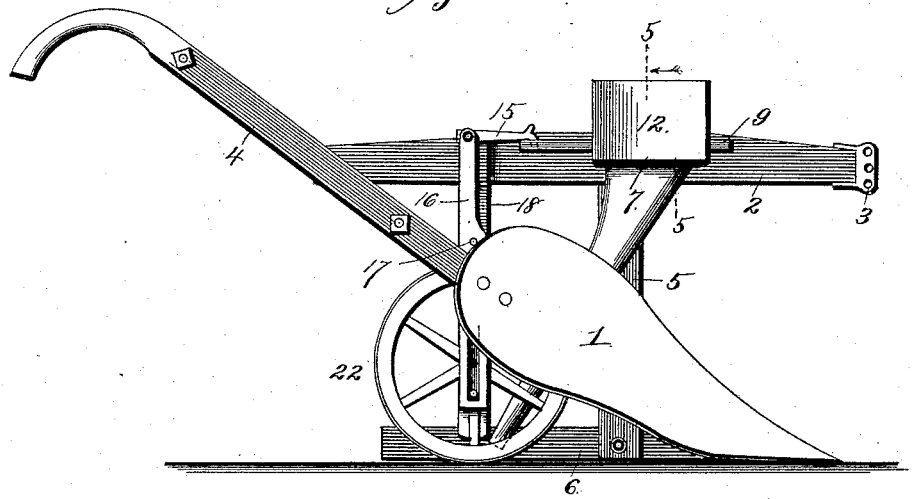
Figure 2:
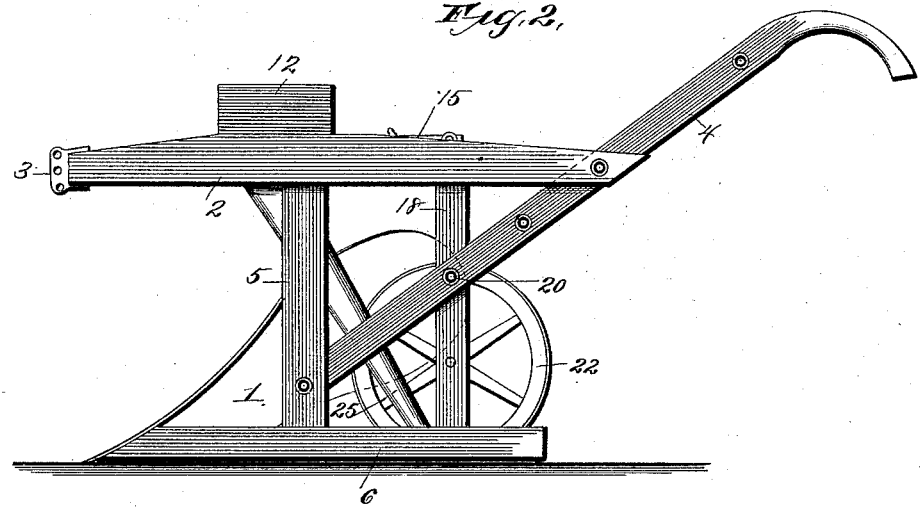

Figure 1 is a side elevation of my improved combined plow and seed-drill looking toward the mold-board side of the implement. Fig. 2 is a similar view of the same looking toward the landside. Fig. 3 is a rear elevation of the same. Fig. 4 is a vertical longitudinal section of the same on the line 4 4 of Fig. 3. Fig. 5 is an irregular transverse vertical section of the same on the line 5 5 of Fig. 1.

In the said drawings, 1 designates the share or mold-board; 2, the beam, carrying at its outer end a suitable clevis; 3 4 the handles or stilts, and 5 the standard or post, to the lower end of which is bolted or otherwise secured the lower horizontal beam 6 of the landside. It is to be understood that these parts may be either of the precise form and relative arrangement shown or of any other suitable or preferred type.

Upon the mold-board side of the beam 2 is mounted a horizontal base-board or bracket 7, through which are formed two openings 8 and upon which rests and reciprocates a slide 9, having a single feed-opening 10, and also upon its upper side pins or projections 11, which serve as agitators for the seed, as hereinafter more fully described, the slide preferably working in a suitable groove or seat in the upper side of said base-board or bracket, as shown in Fig. 5. Upon this bracket or base-board 7 rests a seed-hopper 12, the bottom 13 of which is immediately above the slide 9 and is provided with a single feed-opening 14, which lies intermediately of and above the two feed-openings 8 of the base-board or bracket 7. To the rear end of the slide 9 is detachably connected the hooked front end of a link 15, the rear end of which is pivotally connected to the upper end of an actuating-lever 16. This lever 16 is pivoted about midway of its length, as at 17, upon an offset 21 of a vertical hanger 18, the upper end of which is bolted or otherwise suitably connected, as at 19, to the rear portion of the beam 2 and which is similarly secured, as at 20, to the lower part of the handle 4 at the landside of the machine. The hanger 18 thus occupies a vertically-pendent position at the rear of the standard 5, and upon the lower part of said hanger is journaled a wheel 22, which runs in the bottom of the furrow. Upon one of the spokes of the wheel 22 is secured or formed a suitable stud or pin 23, which works in a longitudinal slot 24 in the lower end of the actuating-lever 16.

25 designates a suitable drill boot or leg, which is bolted or otherwise secured at its upper end to the under side of the base-board or bracket 7 and which extends thence downward and rearward in such manner that its lower end enters the furrow between the wheel 22 and the lower horizontal beam 6 of the landside.

The operation of the above-described mechanism is as follows: As the plow is drawn along by the draft animal or animals hitched in customary manner to the clevis 3 the wheel 22 runs in the furrow, and its revolution, acting through the stud or pin 23 and slot 24, vibrates the actuating-lever 16 forwardly and backwardly. This movement of the actuating-lever is communicated through the link 15 to the slide 9, and consequently the seed is rapidly fed from the hopper 12, and, passing through the boot 25, drops into the furrow. Owing to the detachable connection between the front end of the link 15 and the rear end of the slide 9, whenever it is desired to throw the seeding mechanism out of action the front end of the link 15 is raised out of connection with the rear end of the slide 9 and the latter is set so that its opening 10 registers with the opening 14 in the bottom of the hopper. The plow can now be used without operating the seed mechanism. As the seed mechanism operates, the studs or projections 11 agitate the mass of seed, as above mentioned, and thus prevent clogging.

From the above description it will be seen that I have produced a combined plow and seed-drill which is simple, durable, and inexpensive in construction and which operates with the utmost efficiency.

Having thus described my invention, what I claim as new therein, and desire to secure by Letters Patent, is—

An improved combined plow and seeder comprising a suitable plow-beam, standard, stilts, and mold-board, a horizontal base-board or bracket extending laterally from the beam above the mold-board and provided with a pair of feed-openings, a horizontal longitudinally-reciprocating slide resting upon the bracket and provided with a single feed-opening and with a pair of upwardly-projecting agitator-pins, a feed-hopper mounted upon the bracket and having its bottom overlying the slide and also provided with a single feed-opening, an actuating-wheel journaled behind the plowshare or mold-board and upon the lower part of a standard pendent from the beam, an actuating-lever pivoted upon said pendent standard and longitudinally slotted at its lower end to receive a pin upon one of the spokes of the wheel, a link pivoted upon the upper end of the actuating-lever and having a hooked front end directly and detachably engaging the rear end of the slide, and a drill boot or leg connected at its upper end beneath the bracket and extending rearwardly and downwardly behind the share and having its lower extremity interposed between the wheel and its standard, substantially as set forth.

In testimony whereof I affix my signature in presence of two witnesses.

HENRY F. WISTEMAN.

Witnesses:
 A. W. BALFOUR,
 M. A. NELSON.